(12) United States Patent
Kaestle

(10) Patent No.: US 8,212,397 B2
(45) Date of Patent: Jul. 3, 2012

(54) METHOD FOR OPERATING A LOW-VOLTAGE ELECTRICAL SYSTEM

(76) Inventor: Gunnar Kaestle, Karlsruhe (DE)

( * ) Notice: Subject to any disclaimer, the term of this patent is extended or adjusted under 35 U.S.C. 154(b) by 253 days.

(21) Appl. No.: 12/517,013

(22) PCT Filed: Oct. 22, 2007

(86) PCT No.: PCT/EP2007/009124
§ 371 (c)(1),
(2), (4) Date: May 29, 2009

(87) PCT Pub. No.: WO2008/049556
PCT Pub. Date: May 2, 2008

(65) Prior Publication Data
US 2010/0141030 A1    Jun. 10, 2010

(30) Foreign Application Priority Data
Oct. 26, 2006    (DE) .................. 10 2006 050 509

(51) Int. Cl.
*H02J 1/10* (2006.01)
(52) U.S. Cl. ......................................... 307/43
(58) Field of Classification Search .............. 307/43
See application file for complete search history.

(56) References Cited

U.S. PATENT DOCUMENTS 4,363,974 A    12/1982  Beckwith
7,049,795 B2 *  5/2006  Beckwith ................ 323/258
2005/0042098 A1 *  2/2005  Wobben ................. 416/132 B
2006/0152010 A1    7/2006  Wobben
2008/0265577 A1 * 10/2008  Fortmann et al. .......... 290/44

FOREIGN PATENT DOCUMENTS

| DE | 578544 C | 6/1933 |
| DE | 1159081 B | 12/1963 |
| EP | 0378473 A1 | 7/1990 |
| EP | 0 923 181 A | 6/1999 |
| EP | 2084801 B1 | 8/2009 |
| WO | WO-02/086315 A1 | 10/2002 |
| WO | WO-2005/025026 A1 | 3/2005 |

OTHER PUBLICATIONS

International Search Report dated Mar. 27, 2008, issued in corresponding International Application No. PCT/EP2007/009124 w/ Engish translation.
Muller, Christoph, "We Can Take to Managing Renewable Energy," Polygen House, 1992.
Wasiak et al., A Power Quality Management Algorithm for Low Voltage Grids with Distributed Resources, ISET, 2005.
Belmans et al., Power Quality Improvements Using Inverter-Interfaced Distributed Generators, ISET, 2005.

(Continued)

*Primary Examiner* — Robert L. Deberadinis
(74) *Attorney, Agent, or Firm* — Venable LLP; Robert Kinberg; Christopher Ma

(57) ABSTRACT

Decentralized power generation installations are connected to a low-voltage electrical system LV. These installations can make available control energy. The control of the active power output by the power generation installations into the low-voltage electrical system takes place by means of active variation of the system voltage by means of a transformer T with a variable transformation ratio.

9 Claims, 3 Drawing Sheets

OTHER PUBLICATIONS

Figure 1:
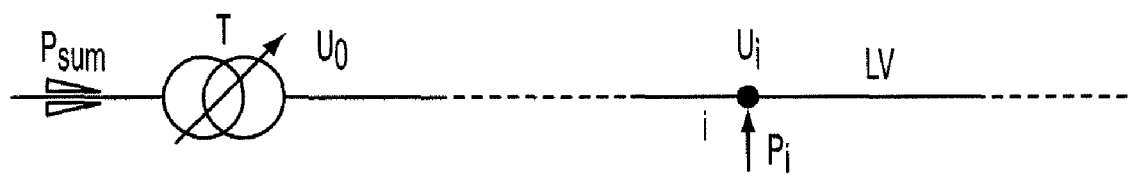

Kashem, M.A. et al., "Distributed Generation as Voltage Support for Single Wire Earth Return Systems," IEEE Transactions on Power Delivery, vol. 19, No. 3, Jul. 2004, pp. 1002-1011.

Office Action issued Apr. 25, 2008 in related German application No. 10 2006050 509.3-32, together with English translation.

Kaestle, Gunnar: "Decentralized Power Supply with Fuel Cells as Virtual Power Plant in the Low-Voltage Grid," (online) Institute for Industrial Management and Industrial Production at the University Karlsruhe (TH); Oct. 2005. [Retrieved on Apr. 25, 2008]. Retrieved from the Internet: URL:http://www.kaestle.eu/NS-VKW.pdf.

Office Action issued Jul. 16, 2007 in related German application No. 10 2006050 509.3-32, together with English translation.

Strauss, P.H. et al.: "Connecting modular systems into a network; control of the grid for economic optimization of decentralized power supply structures with a high share of renewable energy sources;" Final Report, Kassel, Dec. 2005 (online); [Retrieved on Jul. 4, 2007]. Retrieved from the Internet: URL:http://www._iset_page.show_ menu?p_name=7231260&p_lang=ger.

Electricity Association—VDEW-e.V.: Separate production systems on the low-voltage grid. Guidelines for connection and parallel operation of separate generating systems at the low-voltage grid. VWEW Energieverlag (publisher) GmbH Frankfurt am Main, Heidelberg 4, Ed. 2001 (online). [Retrieved on Jul. 4, 2007]: Retrieved from the Internet: URL:http://www.wemag.com/netz/ installateure/handbuch/allgemein/04anschlussbedingungen/rili_ eigenerzns_shm_bb.pdf.

Povlsen, A.F.: Distributed power using PV—Challenges for grid— full text article from News from Renewable Energy World Magazine, Mar.-Apr. 2003 (online) [Retrieved on Jul. 4, 2007]. Retrieved from the Internet: URL:http://web.archive.org/web/20030403233204/ http://www.jxj.com/magsandj/rew/2003_02/distribute_pv.html.

* cited by examiner

METHOD FOR OPERATING A LOW-VOLTAGE ELECTRICAL SYSTEM

The invention relates to a method for operating a low-voltage electrical system to which one or several decentralized power generating installations are connected. The invention relates in particular to providing control energy or compensating energy to the power grid by using decentralized feeders for supplying the electrical power.

Control energy is necessary to synchronize the electrical power generation with the level of consumption that is required for a stable operation of power grids. A distinction is therefore made between primary control power, secondary control power and tertiary control power (the so-called minute reserve). Control energy is normally supplied by thermal power plants and by installations with quick start-up and power-down, for example gas turbine-powered installations and hydroelectric installations.

Distributed Energy Resources (DER) are used, among other things, for feeding power into the low-voltage electrical system. Examples to be mentioned for these types of feeders are photovoltaic systems, micro-hydropower systems and power-generating heating systems (micro-combined heat and power; micro CHP).

If several power feeders are combined to form a composite system, this is known as a "virtual power plant". A virtual power plant of this type has advantages for the total system because of the synergy effects. As a result of the external influencing of the individual systems, it is possible to realize cooperative tasks, such as the collective supplying of control energy or the compensation of consumption peaks.

Providing a central location from which the virtual power plant is controlled and optimized represents one option for coordinating the DER composite system. A different option involves a self-organizing system in which the individual feeders communicate via peer-to-peer connections. In both cases, we refer to a grid control because the power is not only fed in based on the local load behavior, but is also predetermined by the power grid.

Concepts presented in the literature for virtual power plants require a connection to a communication network for each feeder, in addition to the power grid connection. The resulting data volume is considerable. The control of the virtual power plant becomes more and more involved with an increasing number of systems to be controlled. Owing to the intricate structure of a virtual power plant, the costs for communication and control are higher than for large power plants.

It is the object of the present invention to provide a simple and robust method for operating a low-voltage electrical system, which integrates decentralized power feeders into a stable and self-regulating grid operation.

To solve this technical problem, patent claim 1 proposes an active variation of the grid voltage in order to control the active power, which is provided by at least one decentralized feeder to the low-voltage electrical system.

The principle, stating that the power supplied by a feeder to the grid is based on the voltage level at the feed-in node, is known per se. As example, we could mention the automatic electricity exchange system known from the publication "DER GANGBARE WEG IN DIE REGENERATIVE ENERGIEWIRTSCHAFT" [The Path We Can Take To Managing Renewable Energy] by Christoph Müller, Polygon Publishing House, 1992, as well as the two DISPOWER publications by ISET, 2005, "A Power quality Management Algorithm for Low Voltage Grids with Distributed Resources (#17)" by Wasiak, Thoma, Foote and "Power Quality Improvements using Inverter-Interfaced Distributed Generators (#35)" by Belmans, Driesen, Green.

With the known systems and methods, the grid voltage increases or drops in dependence on the power to be tapped at the respective grid segment. In contrast thereto, the invention proposes an active variation of the grid voltage, meaning that the variable reference value for controlling the grid voltage is specified by a higher-order location.

According to the invention, the low-voltage line LV itself functions as physical layer of the data connection for the grid control. The voltage level in that case represents the usable date, transmitted by this line as data bus. In contrast to the inductive characteristic of medium and high voltage lines, the low-voltage lines have a mostly resistive characteristic. As a result, the voltage drop can be used to draw conclusions concerning the load condition of the grid segment.

FIG. 1 illustrates the basic idea behind the invention. If the voltage $U_i$ drops at the feed-in node i, then the fed-in power $P_i$ increases and vice versa. For example, a micro-combined heat and power installation can be connected at the feed-in node i, but it is also possible to connect battery-storage power sources and similar controllable feed-in devices.

With respect to the grid control, the above-described behavior of the feeders results in a comparative energy flow via the transformer T that supplies the grid segment. According to the invention, the dynamic adaptation of the energy flow via the transformer, required among other things for the supply of control energy or for the load-reduction with changing production profiles, is achieved by varying the voltage level $U_o$ on the low-voltage side of the transformer T.

The variable secondary voltage in this case functions as signal carrier for the requirement of a controlled output. In the process, it is advantageous to stay within the tolerance band for the standard voltages, e.g. according to DIN IEC 60038, since an automatic shutdown of one or several decentralized power generating systems would otherwise result in grid instability.

A transformer T with variable transmission ratio is preferably used to actively vary the grid voltage, for example a longitudinal controller with additional voltage coupled-in by a transformer or an on-load tap changer. The voltage can thus be varied in local network stations, but also on a higher voltage level in the transformer substations. Grid voltage controllers in the form of autotransformers, DER with active or reactive power control, or also medium voltage direct current couplings can be mentioned as additional operating means for controlling the voltage in the distribution grid.

If a voltage-variable transformer T lowers the voltage slightly, the decentralized current feeders in the grid segment supplied by the transformer are stimulated to increase the feeding, which leads to a reduced grid load $P_{SUM}$. If the voltage is raised, on the other hand, it causes a reduction in the feeding and thus a higher grid load $P_{SUM}$. For an immediate data-technical node point, it is then only necessary to connect the voltage-variable transformer T into a higher-level control system, which drastically reduces the communication expenditure.

Figure 2:
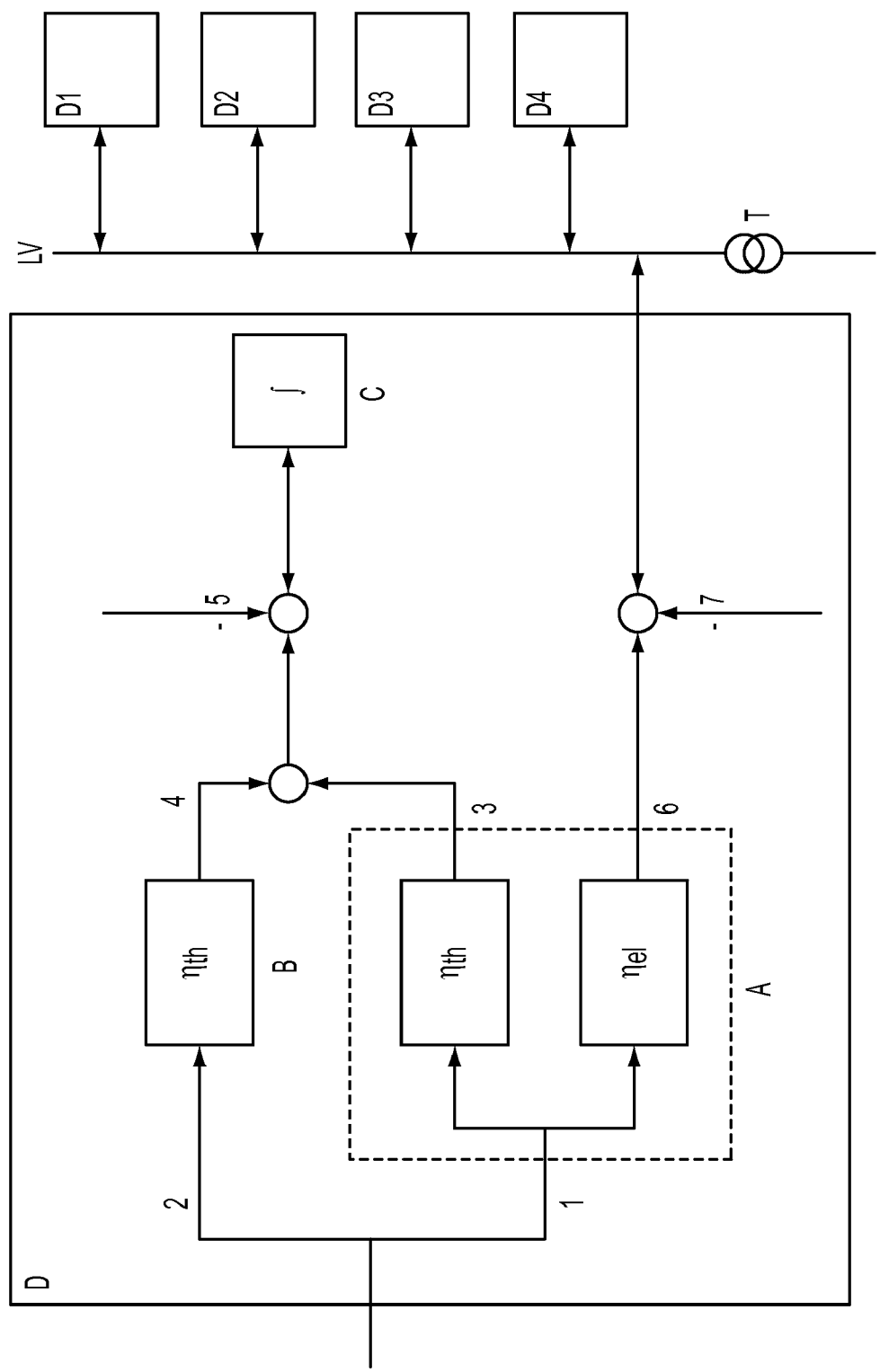

The method according to the invention is explained in further detail in the following with the example of a power-generating heating system. FIG. 2 shows the energy flows within a building D and also the connection to other buildings D1 . . . D4 via a joint low-voltage line LV, which is supplied by a distribution transformer T with a variable transmission ratio.

In addition to the micro-combined heat and power installation (CHP) A, an additional burner B is frequently used in heating installations to cover the thermal peak load, as well as a heat storage C. Natural gas, liquid gas or heating oil can be used as fuel 1 for the CHP installation, but also 2 for the additional burner B. Also possible is the use of energy carriers based on biomass. The waste heat 3 from the CHP unit A, as well as the thermal heat flow 4 from the additional burner B serve to cover the thermal load 5 of the building D. Essentially, this refers to the requirements for the room heat and the hot-water generation. An absorption refrigerating machine is also conceivable as heat sink. The heat storage C uncouples the generating of the heat from the heat demand. The generated electrical energy 6 is thus used for house-internal loads 7 while the remainder is compensated via the low-voltage line LV.

In addition to a heat-controlled mode of operation, a current control and/or a grid control can also be realized as a result of the uncoupling through the heat accumulator. For this, the CHP installation follows the local power demand or a demand specified by the grid. To prevent the surplus heat from dissipating through cooling, a power-controlled or grid-controlled and simultaneously heat-capped operation is selected.

The voltage control represents one form of the grid control, which is based on local, measurable variables. Since the distributed resistance dominates the distributed inductance in low-voltage lines, the CHP installation can deduce the load for the LV grid segment from the voltage measurement at the feed-in point. The feed-in advantageously takes place at a high grid. load, meaning when a voltage valley is present. The value measured for the current in the transmission grid level normally correlates positively with the measured LV grid load. Voltage-sensitive feeders furthermore permit an improved use of the grid operating means since grid expansion measures can be prevented or delayed, based on violations of the voltage band.

Figure 3:
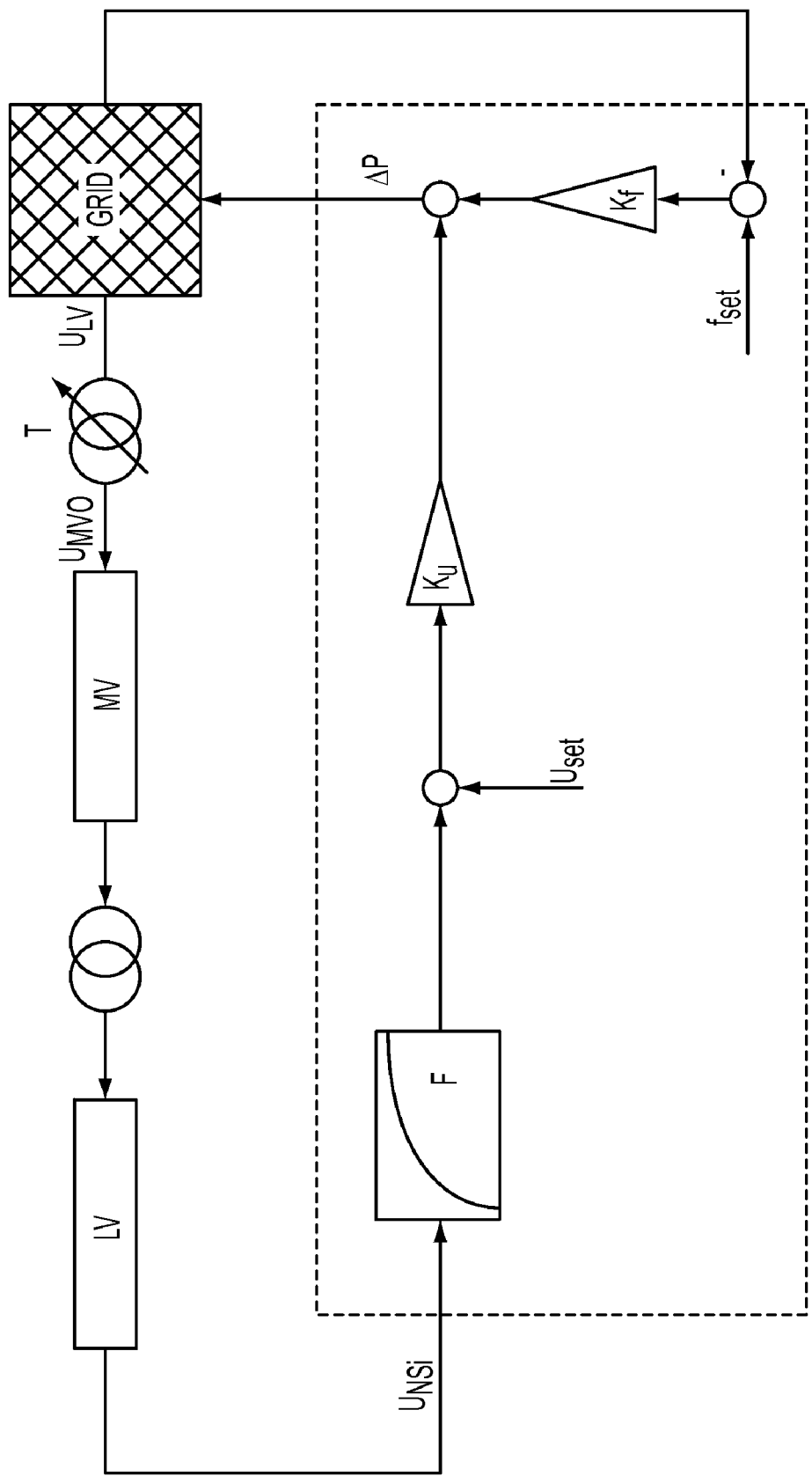

FIG. 3 shows how voltage-controlled power generating installations can be controlled from a central location in the low-voltage (LV) grid. For this example, a primary control of the active power is possible with the aid of the parameters $f_{set}$ and $K_f$. The linking of the active power output to the voltage occurs via a parameter pair $U_{set}$ and $K_U$. The input signal $U_{LVi}$ in this case is processed with the aid of suitable evaluation units or filters in order to fade out rapid voltage changes. The signal to be used involves the slow voltage changes in the time range of minutes, such as are defined in EN 50160. The voltage controller at the on-load tap changer for the power transformer T can now differ from a fixed reference value for $U_{MVO}$ and can select a value that is slightly higher or lower. This voltage change propagates via the medium voltage lines MV and the low voltage LV lines up to the micro CHP installation, which is then stimulated to a lower or higher output $\Delta P$.

Owing to the uncertainty concerning the internal conditions of the power-generating heating systems, in particular the load condition of the heat storage, the control technology behind the voltage-regulation of the on-load tap changer cannot assume a deterministic behavior according to the voltage change for a single power-generating heating system. However, it is possible to statistically detect the system response for a plurality of voltage-controlled DER. Measured dP/dU elasticities that depend on the time of the year and the time of the day are recorded in characteristic diagrams. With the aid of these values, it is possible to determine which control energy pulse can be generated. Armed with this knowledge, a distribution system operator can reduce the grid load peak, relative to a higher-level grid level, or can export control energy into the transmission grid.

The invention claimed is:

1. A method for operating a voltage distribution network to which at least one decentralized electricity generation plant is connected, comprising:
    in the case of falling network voltage, increasing an active power feed-in via the decentralized electricity generation plant,
    in the case of increasing network voltage, lowering the active power feed-in via the decentralized electricity generation plant,
    wherein increasing and lowering the active power feed-in comprises actively varying a reference value for network voltage regulation of the voltage distribution network to regulate the active power feed-in by influencing the network voltage within a tolerance band of standard voltages.

2. The method according to claim 1, comprising regulating the active power time domain of a tertiary control.

3. The method according to claim 1, comprising varying the network voltage with a transformer with a variable transmission ratio.

4. The method according to claim 1, wherein varying the reference value comprises varying the reference value with at least one voltage regulator in the network.

5. The method according to claim 1, wherein varying the reference value comprises varying the reference value with further electricity generation plants via control of the active power or the reactive power.

6. The method according to claim 1, wherein varying the reference value comprises varying the reference value with at least one medium-voltage direct current coupling.

7. The method according to claim 1, comprising:
    measuring of a load flow P in a network segment;
    determining a regulated voltage U at an associated voltage regulator;
    computing a time-dependent dP/dU characteristic; and
    varying the reference value for the network voltage regulation as a function of the dP/dU characteristic.

8. The method according to claim 7, wherein a change in the load flow P corresponds to a predetermined value.

9. The method according to claim 7, wherein a predetermined maximum active power is not exceeded.

* * * * *